Figure 1:
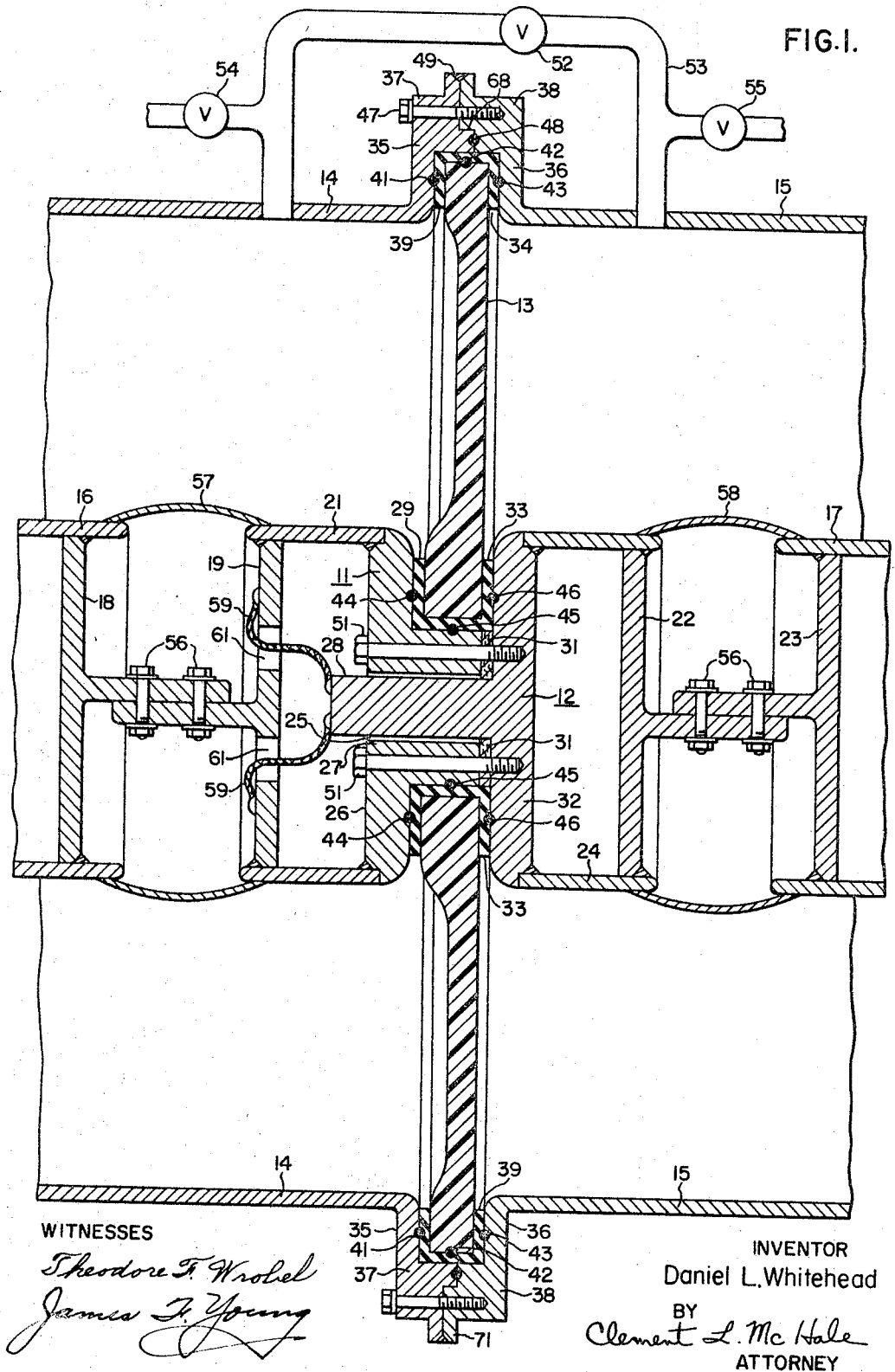

INVENTOR
Daniel L. Whitehead
BY
Clement L. McHale
ATTORNEY

United States Patent Office 3,331,911
Patented July 18, 1967

3,331,911
COAXIAL CABLE JOINT WITH A GAS BARRIER
Daniel L. Whitehead, Franklin Township, Export, Pa., assignor to Westinghouse Electric Corporation, Pittsburgh, Pa., a corporation of Pennsylvania
Filed July 26, 1965, Ser. No. 474,794
10 Claims. (Cl. 174—22)

This invention relates, generally, to electric power distribution systems and, more particularly, to a gas barrier for a pressure insulated piped electrical system of the type described in a copending application Ser. No. 474,779, filed July 26, 1965, by D. L. Whitehead, and assigned to the Westinghouse Electric Corporation.

In the system disclosed in the aforesaid application, a pressurized gas is used as the primary insulating medium inside the pipes which enclose the conductors. Although many different kinds of gas can be used, one of the most favorable ones from the insulation standpoint is sulfur hexafluoride, $SF_6$. However, this gas is relatively expensive. Therefore, it is important that such a system be constructed to provide means for minimizing gas loss during normal operation as well as during inspection and repairing of component parts of the system.

An object of this invention is to provide a combined barrier and insulator for supporting a conductor inside a pipe and for preventing the flow of gas past the barrier.

Another object of the invention is to provide for bypassing the barrier when desired.

A further object of the invention is to provide a combined sealing and voltage gradient reducing arrangement for mounting the insulator in the pipe and on the conductor.

Still another object of the invention is to support the conductor in a manner that will take care of thermal expansion of the conductor.

A still further object of the invention is to provide a heavy duty insulator and barrier structure having increased strength and flexibility.

Other objects of the invention will be explained fully hereinafter, or will be apparent to those skilled in the art.

In accordance with the invention, two generally T-shaped members having round heads and one having a hole extending through its stem and head are disposed with the stem of the other extending through the hole in the first one, thereby providing a variable space between the two heads. In one embodiment, a generally disc-shaped insulator is mounted in the space with seals between the insulator and the heads compressed by drawing the heads together. The outer rim of the insulator is sealed between spaced portions of flanges on the ends of adjoining sections of pipe which enclose the conductor sections, thereby providing a barrier in the pipe. Gas-filling and bypass valves are connected around the barrier. The conductor sections in the pipe are connected to cylindrical extensions on the heads of the T-shaped members to provide an electrical path through the barrier. In another embodiment, two dished disc-shaped insulators are mounted face-to-face in the space between the heads of the T-shaped members, thereby, increasing the strength and flexibility of the structure.

Figure 2:
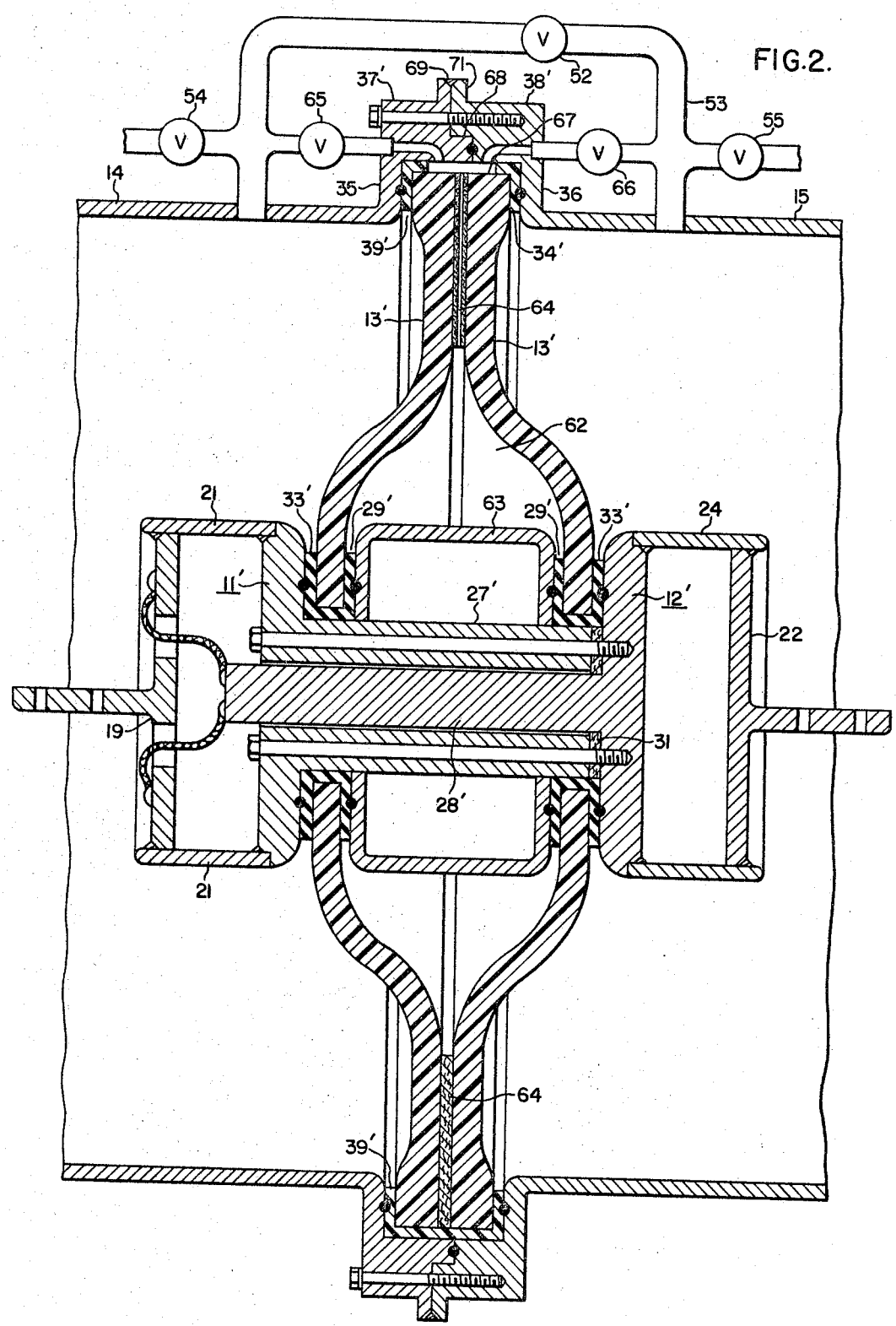

For a better understanding of the nature and objects of the invention, reference may be had to the following detailed description, taken in conjunction with the accompanying drawings, in which:

FIGURE 1 is a view, in section, of a portion of an electric power transmission system embodying features of the invention, and FIG. 2 is a view, similar to FIG. 1, of another embodiment of the invention.

Referring to the drawings and particularly to FIG. 1, the structure shown therein comprises two generally T-shaped members 11 and 12, a generally disc-shaped insulator 13, two cylindrical pipe sections 14 and 15, two cylindrical conductors 16 and 17 disposed inside the pipe sections 14 and 15, respectively, two T-shaped members 18 and 19 which are utilized to connect the conductor 16 to a cylindrical extension 21 on the T-shaped member 11, and two T-shaped members 22 and 23 which are utilized to connect the conductor 17 to an extension 24 on the T-shaped member 12. Each one of the T-shaped members has a round head.

As shown, the T-shaped member 11 has an opening 25 extending through the head 26 and the stem 27 of the T-shaped member. The T-shaped member 12 has a stem 28 which extends through the opening 25 in the T-shaped member 11, thereby providing a variable space 29 between the round heads of the T-shaped members 11 and 12. The insulator 13 is mounted on the stem 27 in the space 29 between the heads of the members 11 and 12. A gasket 31 is disposed between the end of the stem 27 of the T-shaped member 11 and the head 32 of the T-shaped member 12. A gasket 33 is disposed between the insulator 13 and the heads 26 and 32 of the members 11 and 12, respectively, and between the insulator 13 and the stem 27 of the member 11. The gasket 33 is preferably composed of a resilient conducting material, such as carbon-filled neoprene, thereby reducing the voltage gradients at the junction between the insulator 13 and the conducting members 11 and 12 since the insulator 13 is disposed in a slot or recess in the manner described in the copending application Ser. No. 474,774, filed July 26, 1965, by D. F. Shankle and L. A. Kilgore, and assigned to the Westinghouse Electric Corporation.

Likewise, the outer rim of the insulator 13 is disposed in a slot or recess 34 between flange portions 35 and 36 on the pipe sections 14 and 15, respectively. The flanges 35 and 36 have adjoining extensions 37 and 38, respectively, which meet to provide the space 34 between the portions 35 and 36. A gasket 39, preferably composed of resilient conducting material similar to the gasket 33, is provided between the insulator 13 and the flanges 35 and 36. The gaskets 33 and 39 have a generally U-shaped cross section, thereby enclosing portions of the insulator 13. As an additional precaution against leakage past the gasket 39, O-ring seals 41, 42 and 43 may be provided as shown in the drawing. Likewise, O-ring seals 44, 45 and 46 may be provided to cooperate with the gasket 33 to prevent leakage past this gasket. The flanges 35 and 36 may be drawn toward each other to compress the gasket 39 and the O-ring seals 41 and 43 by means of stud bolts 47 in the extensions 37 and 38 of the flanges. An O-ring seal 48 may be provided in the joint between the flange extensions 37 and 38. Also, this joint may be welded as shown at 49 to prevent leakage through the joint.

The heads 26 and 32 of the T-shaped members 11 and 12, respectively, may be drawn towards each other by means of stud bolts 51 which extend through the member 11 and are threaded into the member 12. Thus, the gasket 33 and the O-ring seals 44 and 46 are compressed to prevent leakage past the gasket.

In order to bypass the barrier formed by the insulator 13, a valve 52 is connected in a pipeline 53 which is connected to the pipe sections 14 and 15 on opposite sides of the barrier 13. Gas-filling valves 54 and 55 are also connected to the pipeline 53 to permit the pipe sections 14 and 15 to be filled with the insulating gas. Thus, by operating the valves 52, 54 and 55, the insulating gas may be permitted to flow past the barrier 13 or prevented from flowing past the barrier, and pressure may be maintained or exhausted from either one of the pipe sections 14 and 15 independently of the other section.

In order to support the conductor 16, it is connected to the cylindrical extension 21 on the head of the T-shaped member 11 by means of the T-shaped members 18 and 19 the heads of which may be welded to the conductor 16 and the extension 21, respectively, and the stems of which are bolted together by bolts 56. Likewise, the conductor 17 is connected to the extension 24 on the T-shaped member 12 by the T-shaped members 22 and 23, the stems of which are bolted together by additional bolts 56. The space between the conductor 16 and the extension 21 may be bridged by a corona shield 57. Likewise, the space between the conductor 17 and the extension 24 may be bridged by a corona shield 58. Thus, the conductors 16 and 17 are mechanically supported inside the pipe sections 14 and 15, respectively, by the combined barrier and insulator 13.

In order to provide a low resistance current path through the barrier from the conductor 16 to the conductor 17, flexible connectors 59 are connected between the end of the stem 28 of a T-shaped member 12 and the head of the T-shaped member 19 which, in turn, is connected to the extension 21 on the head 26 of the T-shaped member 11. Thus, relative movement between the T-shaped members 11 and 12 is permitted and a low resistance current path through the members is provided. In order to provide access to the bolts 51, openings 61 are provided in the head of the T-shaped member 19 opposite the heads of the stud bolts 51. The connectors 59 extend through the openings 61 to permit them to be attached to the head of the T-shaped member 19.

The structure shown in FIG. 2 is generally similar to the structure of FIG. 1 except that the T-shaped members 11′ and 12′ have longer stems 27′ and 28′, respectively, and two dished disc-shaped insulators 13′ are provided instead of one insulator. The insulators 13′ are disposed face-to-face, thereby providing a space 62 between the dished portions of the insulators. In this manner, the strength of the barrier is increased to permit it to withstand higher pressures and it has flexibility to permit thermal expansion and contraction of the conductors 16 and 17 which are connected to the T-shaped members 11′ and 12′ in the manner hereinbefore described. A compression spacer 63 is disposed around the stem 27′ between the dished portions of the insulators 13′. This spacer serves two purposes. First, it acts as a seat for one side of the gas seal between each one of the insulators 13′ and the T-shaped members 11′ and 12′. Secondly, it provides a shield which cooperates with the heads of the members 11′ and 12′ to provide the slot or recess 29′ in which each one of the insulators 13′ is disposed to reduce the voltage gradients at the joints between the insulators and the conductor in the manner hereinbefore described.

The outer rims of the insulators 13′ are disposed in the space 34′ provided between the flanges 35 and 36 on the pipe sections 14 and 15, respectively. The extensions 37′ and 38′ are longer than the extensions 37 and 38 to provide the additional space 34′ required for the two rims of the two insulators 13′. The gasket 39′ is also correspondingly wider than the gasket 39.

A gasket 64 provided between the rims of the insulators 13′ is not a pressure seal, but is a mechanical pad to compensate for irregularities in the surfaces of the discs and to distribute mechanical loading between the discs. The gasket 64 is perforated to permit gas to enter the space 62 between the dished portions of the discs 13′. In normal operation, this area is filled with gas at the same pressure as the adjoining pipe sections. This prevents electrical breakdown between the discs.

A bypass valve 52 and gas filling valves 54 and 55 function in the manner hereinbefore described. Vent control valves 65 and 66 are connected to the pipe 53 on opposite sides of the bypass valve 52 and to an opening 67 in the gasket 39′ to permit gas to be supplied to or exhausted from the area 62 through the perforations in the gasket 64.

The flange extensions 37′ and 38′ overlap at 68 to act as a guide means in fitting the flange faces together and also to provide a stop to prevent any weld beads or waste material from entering the joint when the flange faces are welded together at 69. A similar offset is provided in the structure shown in FIG. 1. In the event it becomes necessary to remove a barrier, the external weld can be chipped or ground off. The unit can be reassembled by simply welding the external flanges together again. Rim portions 71 on the flanges are of sufficient depth to permit them to be rewelded several times.

From the foregoing description it is apparent that the invention provides a combined barrier and insulator for supporting a conductor inside a pipe and for preventing the flow of gas past the barrier. Provision is made for bypassing the barrier when desired. Thus, sections of a transmission or distribution system may be sealed off when being repaired and the remainder of the system can be operated without loss of the insulating medium contained in the system. The insulators are mounted in a manner to provide a combined sealing and voltage gradient reducing arrangement. The insulator and barrier structure is such that it may be prefabricated at a factory and then readily installed in the transmission or distribution system.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

I claim:

1. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, a generally disc-shaped insulator mounted in the space between the heads with its outer rim disposed in the space between said flanges to provide a barrier in said pipe, sealing means disposed in said spaces, means for drawing the two heads and the two flanges together to compress the sealing means, and conductors connected to said heads to provide a current path through the barrier formed by the insulator.

2. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, a generally disc-shaped insulator mounted in the space between the heads with its outer rim disposed in the space between said flanges to provide a barrier in said pipe, resilient conducting means disposed between said insulator and said T-shaped members, additional resilient conducting means disposed between said insulator and said flanges, means for drawing the two heads and the two flanges together to compress said resilient means, and conductors connected to said heads to support the conductors and provide a current path through the barrier formed by the insulator.

3. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, a generally disc-shaped insulator mounted in the space between the heads with its outer rim disposed in the space between said flanges to provide a barrier in said pipe, sealing means disposed in said spaces, means for drawing the two heads and the two flanges together to compress the sealing means, conductors connected to said heads to provide a current path through the barrier formed by the insulator, and valve means connected to the pipe sections to bypass the barrier and permit filling the pipe with an insulating gas.

4. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, a generally disc-shaped insulator mounted in the space between the heads with its outer rim disposed in the space between said flanges to provide a barrier in said pipe, sealing means disposed in said spaces, means for drawing the two heads and the two flanges together to compress the sealing means, cylindrical extensions on said heads, first additional T-shaped members having heads attached to said extensions, second additional T-shaped members having stems attached the stems of said first additional T-shaped members, and cylindrical conductors attached to the heads of the second additional T-shaped members.

5. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, a generally disc-shaped insulator mounted in the space between the heads with its outer rim disposed in the space between said flanges to provide a barrier in said pipe, sealing means disposed in said spaces, means for drawing the two heads and the two flanges together to compress the sealing means, cylindrical extensions on said heads, first additional T-shaped members having heads attached to said extensions, second additional T-shaped members having stems attached the stems of said first additional T-shaped members, cylindrical conductors attached to the heads of the second additional T-shaped members, and a flexible conductor connecting the head of one of said first additional T-shaped members to the stem which extends through the hole in said one T-shaped member.

6. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, a generally disc-shaped insulator mounted in the space between the heads with its outer rim disposed in the space between said flanges to provide a barrier in said pipe, sealing means disposed in said spaces, means for drawing the two heads and the two flanges together to compress the sealing means, cylindrical extensions on said heads, first additional T-shaped members having heads attached to said extensions, second additional T-shaped members having stems attached the stems of said first additional T-shaped members, cylindrical conductors attached to the heads of the second additional T-shaped members, the head of one of said first additional T-shaped members having holes therethrough providing access to the means for drawing said first-mentioned heads together, and flexible conductors extending through said holes to connect the head having the holes therethrough to the stem which extends through the hole in said one T-shaped member.

7. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, two dished generally disc-shaped insulators mounted face-to-face in the space between the heads with their outer rim disposed in the space between said flanges to provide a barrier in said pipe, sealing means disposed in said spaces, means for drawing the two heads and the two flanges together to compress the sealing means, and conductors connected to said heads to provide a current path through the barrier formed by the insulators.

8. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, two dished generally disc-shaped insulators mounted face-to-face in the space between the heads with their outer rims disposed in the space between said flanges to provide a barrier in said pipe, resilient conducting means disposed between said insulators and said T-shaped members, additional resilient conducting means disposed between the rims of said insulators and said flanges, means for drawing the two heads and the two flanges together to compress said resilient means, and conductors connected to said heads to support the conductors and provide a current path through the barrier formed by the insulator.

9. In an electric power distribution system, in combination, two sections of cylindrical pipe having external end flanges with adjoining extensions thereon to provide a space between portions of the flanges, two generally T-shaped members having round heads and one having a hole through its head and stem with the stem of the other extending through the hole in the first one to provide a space between the heads, two dished generally disc-shaped insulators mounted face-to-face in the space between the heads with their outer rims disposed in the space between said flanges to provide a barrier in said pipe, spacing means disposed between the insulators around the stem of the T-shaped member having the hole therethrough, resilient conducting means disposed between the insulators and the spacing means and the T-shaped members, additional resilient conducting means disposed between the rims of said insulators and said flanges, means for drawing the two heads and the two flanges together to compress said resilient means, and conductors connected to said heads to support the conductors and provide a current path through the barrier formed by the insulator.

10. In an electric power distribution system, in combination, two sections of cylindrical pipe having external end flanges with adjoining extensions thereon to provide a space between portions of the flanges, two generally T- shaped members having round heads and one having a hole through its head and stem with the stem of the other extending through the hole in the first one to provide a space between the heads, two dished generally disc-shaped insulators mounted face-to-face in the space between the heads with their outer rims disposed in the space between said flanges to provide a barrier in said pipe, perforated gasket means disposed between the rims of said insulators, sealing means disposed in said spaces, means for drawing the two heads and the two flanges together to compress the gasket means and the sealing means, conductors connected to said heads to provide a current path through the barrier formed by the insulators, valve means connected to the pipe sections to bypass the barrier and permit filling the pipe with an insulating gas, and additional valve means controlling the supplying of gas into the space between the dished portions of the insulators.

No references cited.

LEWIS H. MYERS, *Primary Examiner.*

H. HUBERFELD, *Assistant Examiner.*